United States Patent [19]
Morris et al.

[11] Patent Number: 4,945,849
[45] Date of Patent: Aug. 7, 1990

[54] RETRACTABLE CLEAT

[75] Inventors: John L. Morris; Robert L. Martin, both of Springfield, Mo.

[73] Assignee: Bass Pro Shops, Inc., Springfield, Mo.

[21] Appl. No.: 364,075

[22] Filed: Jun. 9, 1989

Related U.S. Application Data

[63] Continuation-in-part of Ser. No. 173,878, May 28, 1988.

[51] Int. Cl.⁵ .............................................. B63B 21/04
[52] U.S. Cl. .................................... 114/218; 410/107; 410/111; 24/115 R; 24/115 G
[58] Field of Search ................. 114/218; 410/107, 111; 24/115 R, 115 G, 239

[56] References Cited

U.S. PATENT DOCUMENTS 2,729,417  6/1953  Maynard .
3,102,708  9/1963  Crain .
4,354,445  10/1982  Kafka et al. .

FOREIGN PATENT DOCUMENTS 635569  1/1935  Fed. Rep. of Germany .

Primary Examiner—Sherman D. Basinger
Assistant Examiner—Thomas J. Brahan

[57] ABSTRACT

A retractable boat cleat which moves alternately between extended and retracted positions upon alternate depressions of the cleat. A pivotal latch with notched ends cooperates with a specially spaced recess in the cleat and a pair of compression springs to provide the alternate extension and retraction.

9 Claims, 2 Drawing Sheets

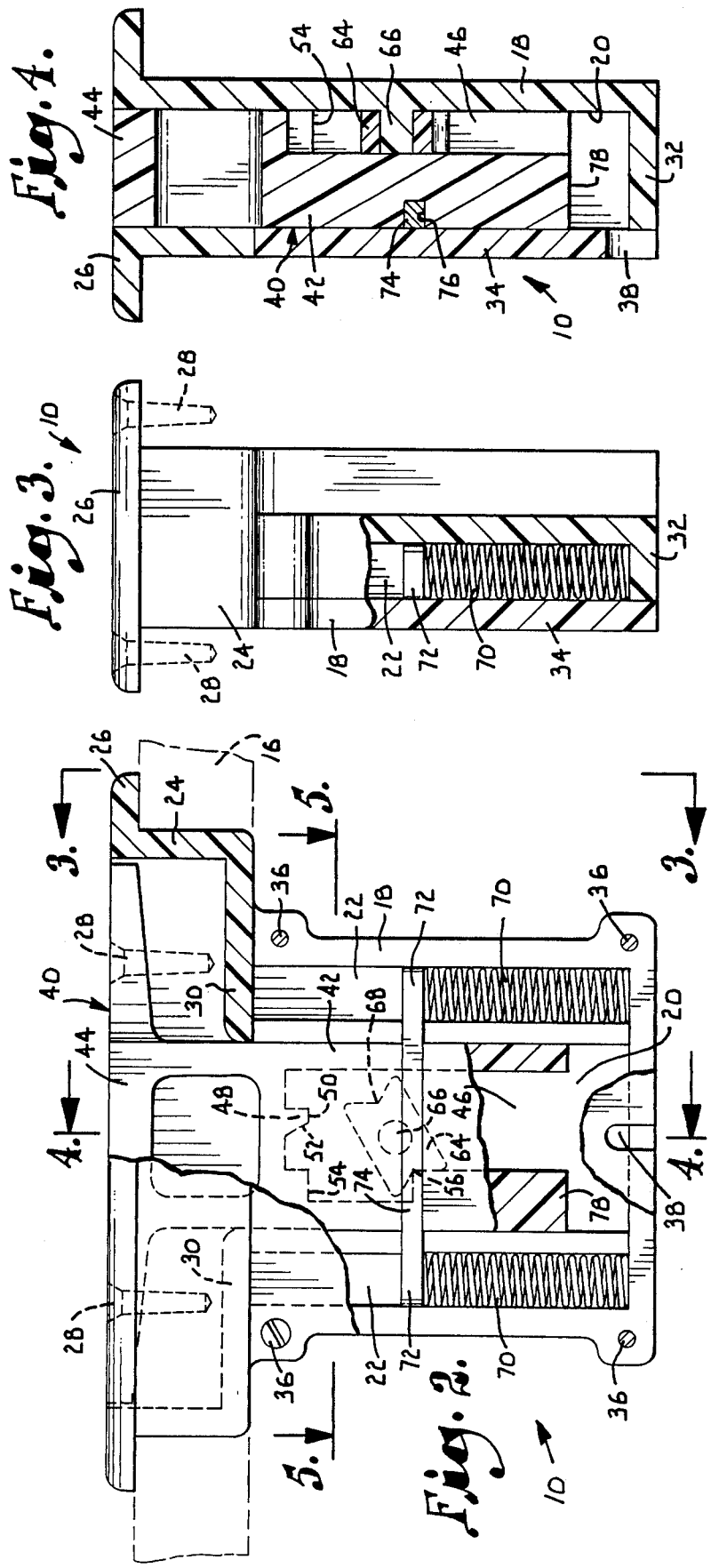

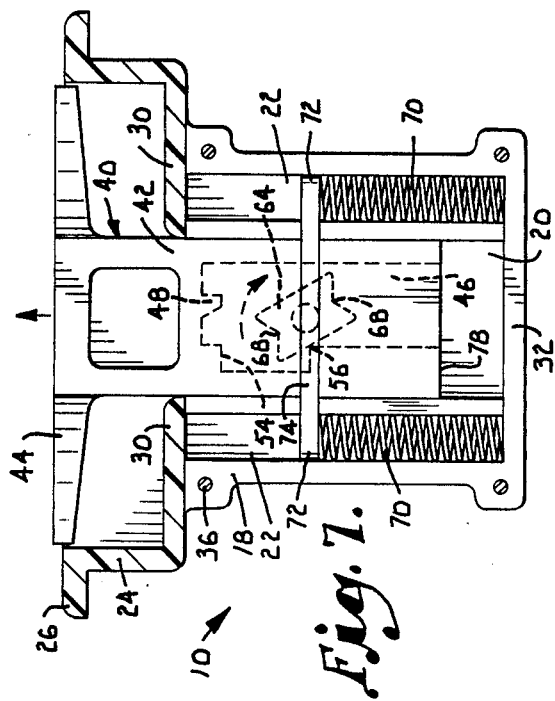
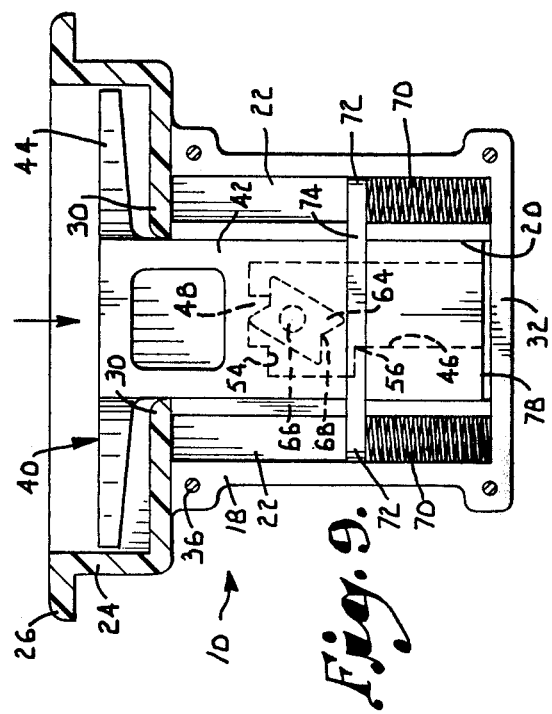
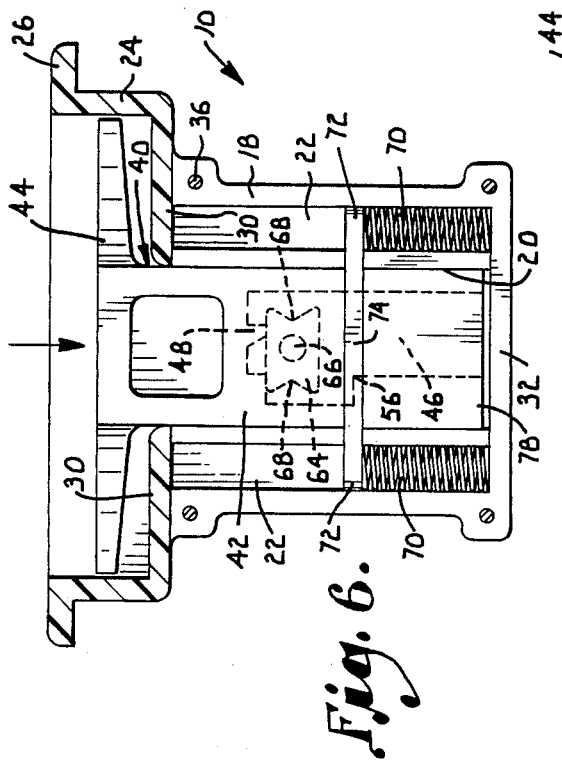
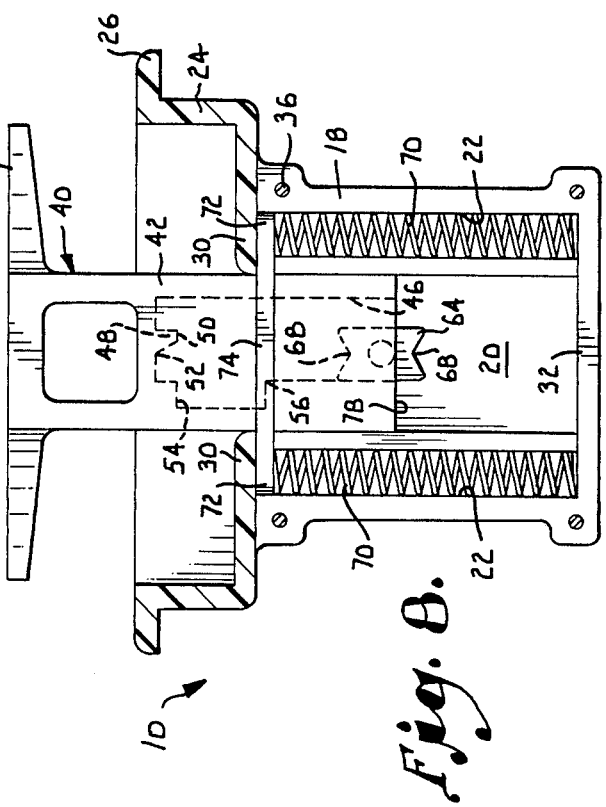

RETRACTABLE CLEAT

RELATED APPLICATION

This application is a continuation in part of co-pending application Ser. No. 173,878, filed on May 28, 1988 and entitled "Retractable Cleat".

BACKGROUND AND SUMMARY OF THE INVENTION

The co-pending application referenced above discloses a retractable cleat which exhibits significant advantages in many respects over prior devices, particularly in the ease with which it operates. The present invention is directed to a retractable cleat which is for the most part identical to the device disclosed in the above referenced application, but which is improved in its construction in order to make it more compact. It has been discovered that the use of two compression springs acting against an intermediate part of the cleat body allows for a reduced height, and thus in turn allows installation in places where the available space is limited. Consequently, the device of the present invention can be installed in areas where other devices will not fit.

DESCRIPTION OF THE DRAWINGS

In the accompanying drawings which form a part of the specification and are to be read in conjunction therewith and in which like reference numerals are used to indicate like parts in the various views:

FIG. 1 is a perspective view showing the bow area of a boat equipped with a pair of retractable cleats constructed according to the present invention, with one of the cleats extended and the other retracted;

FIG. 2 is a side elevational view of one of the retractable cleats, with portions broken away and shown in section for purposes of illustration and the cleat shown in the retracted position;

FIG. 3 is an end elevationals view taken generally along line 3—3 of FIG. 2 in the direction of the arrows, with a portion shown in section for purposes of illustration;

FIG. 4 is a sectional view, taken generally along line 4—4 of FIG. 2 in the direction of the arrows;

FIG. 5 is a sectional view taken generally along line 5—5 of FIG. 2 in the direction of the arrows;

FIG. 6 is a side elevational view similar to FIG. 2 but showing the cleat depressed from the retracted position of FIG. 2 to pivot the latch member away from the latching position;

FIG. 7 is a side elevational view similar to FIGS. 2 and 6 but showing the cleat moving upwardly toward the extended position;

FIG. 8 is a side elevational view similar to FIGS. 2 and 6–7 but showing the cleat in the extended position; and FIG. 9 is a side elevational view similar to FIGS. 2 and 6–8 but showing the cleat depressed into the cavity of the housing from the extended position.

DETAILED DESCRIPTION OF THE INVENTION

The retractable cleat device of the present invention is generally identified by numeral 10 and may be mounted at any suitable location on a boat 12. (FIG. 1). The device 10 may be mounted on the boat gunwale 14 or, as shown, on a bow deck 15 in tandem with a second, identical device 10 located near the opposite side of the boat.

The operating parts of device 10 are housed within a housing 18 which presents within it a cavity 20 having spring chambers 22 on its opposite sides or ends. The upper portion 24 of housing 18 is somewhat longer from end to end than the lower portion and the cavity 20 thus has a T-shaped configuration. An out-turned flange 26 is formed on the top edge of the housing and may be screwed to the bow deck 16 by screws 28 to mount the housing at a recessed position, as shown in FIGS. 1 and 2. The housing 18 includes stop surfaces 30 which overlie the spring chambers 22. The housing has a bottom 32 which forms the bottom of cavity 20. A side plate 34 is screwed at 36 to housing 18 to enclose the cavity 20 and the spring chambers 22. The lower edge portion of the plate 34 presents a weep hole 38 through which water can drain from the housing.

A cleat 40 is received within cavity 20 for reciprocating movement between the retracted position of FIG. 2 and the extended position of FIG. 8. Cleat 40 is generally T-shaped and is dimensioned to fit within the T-shaped cavity 20 formed in housing 18. Cleat 40 has a shank or body 42 and a head portion 44 extending laterally beyond body 42. Head 44 has dimensions corresponding generally to the part of the cavity 20 that is formed in the upper portion 24 of the housing.

Body 42 has a size and shape to fit closely in cavity 20 between the spring chambers 22. The body 42 is provided with a recess 46 having a special configuration. A downwardly extending finger 48 at the top of recess 46 presents a flat, horizontal surface 50 on its tip and an inclined surface 52 on one side. Another flat surface 54 is coplanar with surface 50 on one side of it. Below surface 54, a corner 56 is formed on one side of the recess 46.

A pivotal latch 64 operates in recess 46 and is mounted to turn on a horizontal pin 66 which is integral with the side of housing 18 opposite plate 34. Latch 64 has a V-shaped notch 68 in each of its ends.

A compression spring 70 is mounted in each spring cavity 22. The springs 70 engage bottom 32 at their lower ends and at their upper ends engage small plates or lugs 72 which project into the spring chambers 22 and are formed on the opposite ends of a bar 74. As best shown in FIGS. 4 and 5, the bar 74 is fitted closely in a groove 76 formed in the body of cleat 40 at a location intermediate the head 44 and the lower or base end 78 of the cleat. Thus, bar 74 is fixed to the cleat and the compression springs 70 continuously urge the cleat outwardly toward the extended position.

In use, cleat 34 can be moved between the extended position shown in FIG. 8 and the retracted position shown in FIG. 2. In the extended position, the head 44 projects well out of cavity 20 where it is readily accessible to allow a boat line to be tied to it. The lugs 72 engage stop surfaces 30 in the extended position to limit movement of the cleat out of the housing.

In the retracted position, the head 44 is recessed into cavity 20 and is wholly located within housing portion 24 with the top surface of head 44 substantially flush with the top surface of flange 26. When the cleat is retracted, the base end 78 of the cleat body is adjacent to but spaced slightly above the housing bottom 38. Movement between the retracted and extended positions is effected by alternate depressions of cleat 40.

To illustrate the above movement, the cleat is shown in its retracted and latched position in FIG. 2. As can be seen, head 44 of cleat 40 is substantially at the top of cavity 20. As to the latching mechanism, one of the V-shaped notches 68 is in registration with and engagement with shoulder 56, and latch 64 cannot pivot farther in a clockwise direction so that the cleat 40 is unable to move any farther upward. This locks the cleat 40 in its retracted position due to the wedging effect of latch 64. In order to move the cleat to its extended position, pressure must be exerted on head 44 (as with the fingers) to depress the cleat in cavity 20 to the position shown in FIG. 5. This moves surface 50 into contact with the right end of latch 64, thus pivoting the latch clockwise until one of its sides is in contact with surfaces 50 and 54 in the position of FIG. 6. As pressure is then released from head 44, the spring force of springs 70 forces the cleat upwardly and one side of the latch 64 comes into contact with corner 56 in the position shown in FIG. 7. This pivots the latch clockwise, and the side of the latch eventually comes into flat contact with the side of the cavity, allowing the cleat to extend fully to the position of FIG. 8. In this position, the lugs 72 contact stop surfaces 30 to prevent additional outward movement of the cleat.

In order to return the cleat from its extended position to its latched or retracted position, cleat head 44 is again depressed from its extended position thereby compressing springs 70 and forcing cleat 40 back into cavity 18. As the base end 78 of the cleat approaches the bottom 78 of the housing, the finger 48 contacts the top end of latch 64 to the right side of center, thus pivoting the latch clockwise. When one side of the notch 68 is in flat contact with surface 52 as shown in FIG. 9, further clockwise movement of the latch is prohibited and the lower notch 68 is in position to receive corner 56 when the cleat 40 is thereafter released. This again latches the cleat in its retracted position.

In this manner, the cleat 40 is moved alternately between its extended and retracted positions upon successive depressive forces applied to its head 44. The latch 64 is rotated through a 180° pivot arc between successive latching positions of the latch, and the latch is thus subjected to equal wear on its notches 68 and other surfaces. Because the springs 70 act against intermediate parts of the cleat body, the height of the housing is reduced and the device can be installed in places where space is limited. At the same time, the provision of two cooperating springs of equal spring force prevents the cleat from becoming cocked or skewed or otherwise disoriented and possibly hanging up or becoming jammed in the housing.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. A device for securing a boat line, comprising:
a housing presenting a cavity therein;
a cleat having a body and a head on said body for receiving the boat line, said cleat being received in said housing for reciprocating movement in said cavity between an extended position wherein said head projects out of the cavity and is accessible to receive the boat line and a retracted position wherein said head is recessed into the cavity;
means for alternately effecting the extended and retracted positions of said cleat in response to successive depressive forces applied to said head; said alternately effecting means having a spring means for urging said cleat toward the extended position;
a latch member mounted in said housing for pivotal movement between a latching position wherein said latch member acts to latch the cleat in the retracted position and an extended position wherein said latch member releases the cleat for movement thereof to the extended position under the influence of said spring means;
means for alternately effecting the latching and release positions of said latch member in response to successive depressions of said head; and wherein
said housing presents a pair of spring chambers on opposite sides of said cavity;
said spring means comprises a pair of compression springs mounted in the respective spring chambers and acting against said cleat in a manner to continuously urge it toward the extended position.

2. The device of claim 1, wherein:
said body has a base end remote from said head; and
said body includes a pair of projections extending into the respective spring chambers against which said springs act, said projections being located between said base end and head.

3. The device of claim 2, including a pair of stop surfaces on said housing located to be engaged by said projections to limit movement of the cleat to said extended position.

4. A device for securing a boat line, comprising:
a housing presenting a cavity therein;
a cleat having a body and a head on said body for receiving the boat line, said cleat being received in said housing for reciprocating movement in said cavity between an extended position wherein said head projects out of the cavity and is accessible to receive the boat line and a retracted position wherein said head is recessed into the cavity;
yieldable means for continuously urging said cleat toward the extended position thereof;
a latch element mounted in said housing for pivotal movement between a latching position wherein the latch element acts to latch the cleat in its retracted position and a release position wherein the latch element releases the cleat to permit movement of the cleat to its extended position under the influence of said yieldable means, said latch element and cleat being arranged to alternately effect the latching and release position of said latch element automatically upon successive depressions of said cleat; and wherein
said housing presents a pair of spring chambers on opposite sides of said cavity;
said yieldable means comprises a pair of compressing springs mounted in the respective spring chambers and acting against said cleat in a manner to continuously urge it toward the extended position.

5. The device of claim 4, wherein:
said body has a base end remote from said head; and said body includes a pair of projections extending into the respective spring chambers against which said springs act, said projections being located between said base end and head.

6. The device of claim 5, including a pair of stop surfaces on said housing located to be engaged by said projections to limit movement of the cleat to said extended position.

7. A device for securing a boat line, comprising:
 a housing presenting a cavity therein and a pair of spring chambers on opposite sides of said cavity, said cavity having a bottom;
 a cleat having a body and a head on said body for receiving the boat line, said cleat being received in the cavity for reciprocating movement between an extended position wherein said head projects out of the cavity and is accessible to receive the boat line and a retracted position wherein the body is situated adjacent to but spaced from bottom and the head is recessed into the cavity;
 a pair of compression springs in the respective spring chambers acting against said body of the cleat in a manner to continuously urge the cleat toward the extended position; and
 releaseable latch means selectively operable to latch said cleat in the retracted position, said latch means being releaseable to allow the cleat to move to the extended position under the influence of said spring.

8. The device of claim 7, wherein:
 said body has a base end remote from said head; and
 said body includes a pair of projections extending into the respective spring chambers against which said springs act, said projections being located between said base end and head.

9. The device of claim 8, including a pair of stop surfaces on said housing located to be engaged by said projections to limit movement of the cleat to said extended position.

* * * * *